March 24, 1970  C. VAN DER LELY  3,501,901
MOWING MACHINES

Filed March 17, 1966  2 Sheets-Sheet 1

INVENTOR
CORNELIS VAN DER LELY
BY
Mason, Mason & Albright
Attorneys

March 24, 1970  C. VAN DER LELY  3,501,901
MOWING MACHINES
Filed March 17, 1966  2 Sheets-Sheet 2
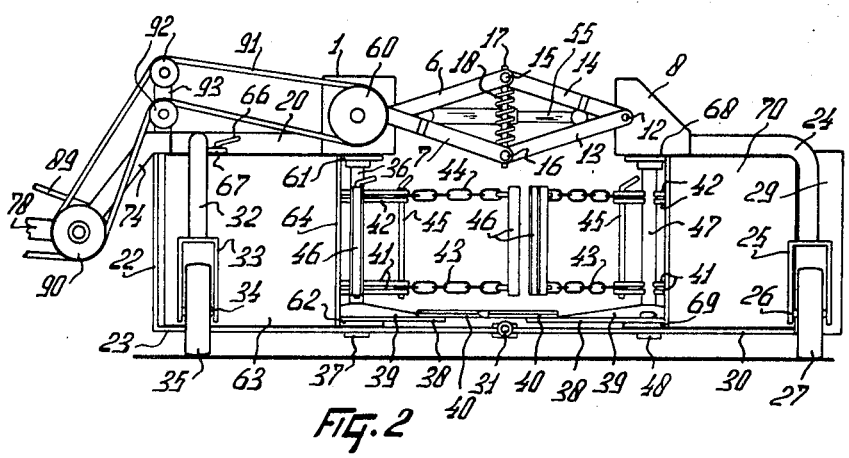
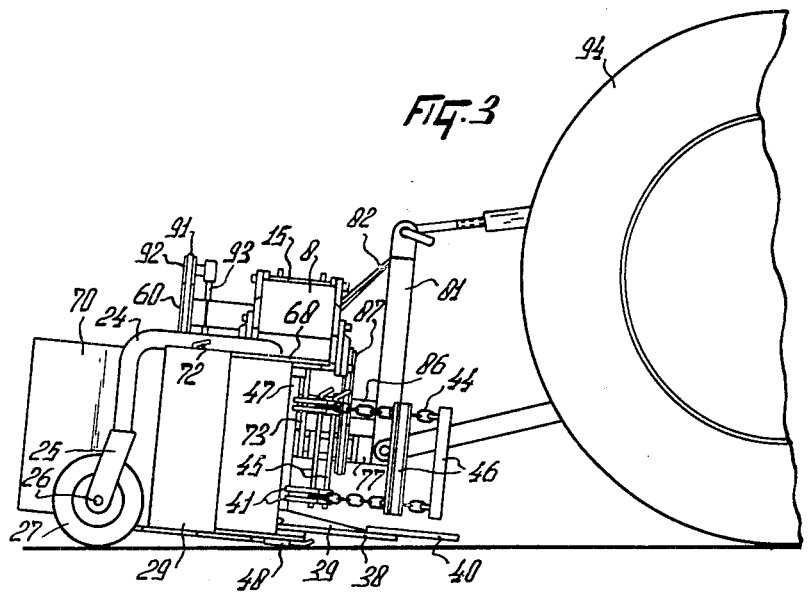
INVENTOR
CORNELIS VAN DER LELY

United States Patent Office 3,501,901
Patented Mar. 24, 1970

3,501,901
MOWING MACHINES
Cornelis van der Lely, 7 Bruschenrain,
Zug, Switzerland
Filed Mar. 17, 1966, Ser. No. 535,199
Claims priority, application Netherlands, Mar. 29, 1965,
6503953
Int. Cl. A01d 75/30, 35/26
U.S. Cl. 56—6                    12 Claims

ABSTRACT OF THE DISCLOSURE

A mowing machine in which one or more mowers is located laterally of the prime mover, the mower extending transverse to the direction of normal travel. The mower has cutting members, rotatable about non-horizontal axes and one or more ground wheels positioned to enable the cutting members to maintain their respective cutting positions over uneven ground.

---

Figure 1:
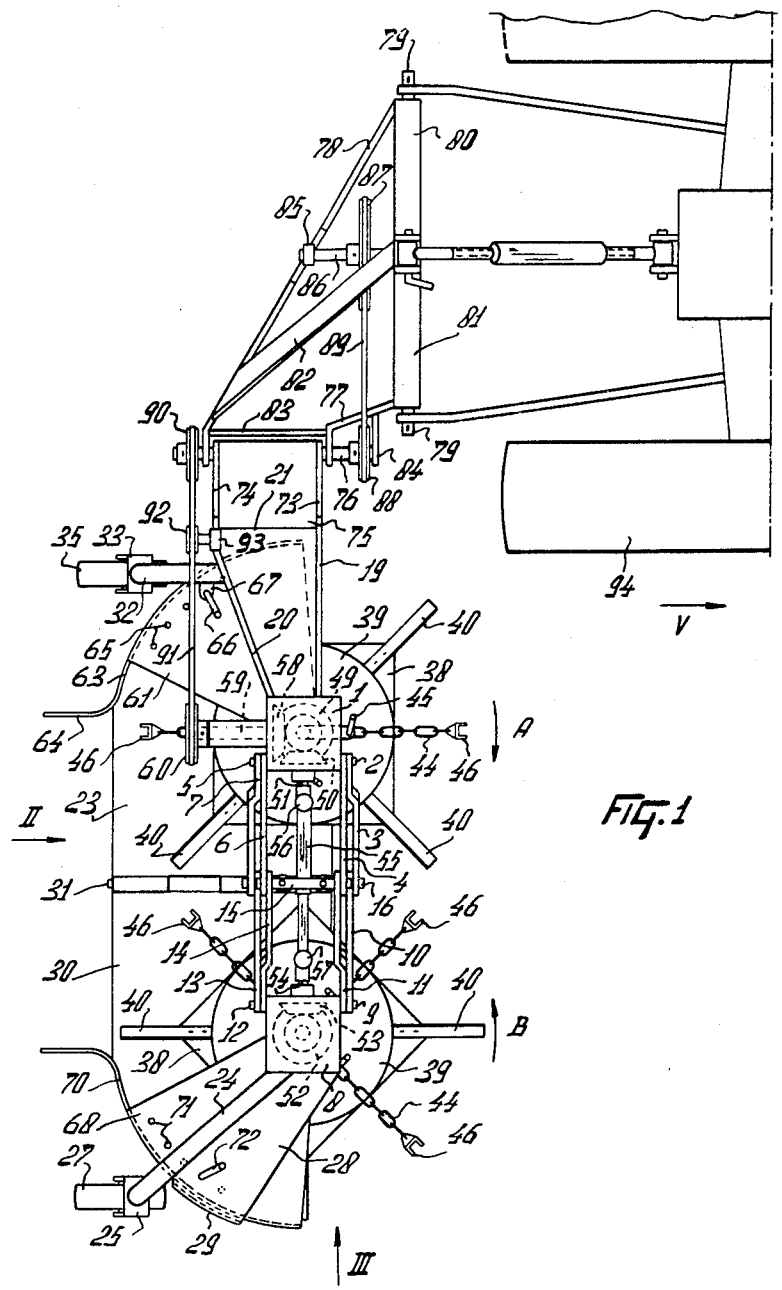

This invention relates to mowing machines of the kind comprising a frame movable over the ground and supporting a group or row of at least two mowing members each of which is rotatable about a non-horizontal axis, the row extending transverse to the intended direction of operative travel of the machine.

An object of the invention is the provision of a simple, effective and versatile mowing machine which can preferably be tractor-mounted without difficulty.

According to the invention, there is provided a mowing machine of the kind set forth which includes coupling members arranged to enable the machine to be rearmounted on the lifting device of a tractor or other propelling vehicle in such a way that the mowing members are located to one side of the path of travel of said tractor or other vehicle during operation of the machine, the machine including a frame-supporting ground wheel which is located near one end of the group or row of mowing members and, when viewed in the intended direction of operative travel of the machine, between the mowing members and the coupling members.

For a better understanding of the invention, and to show how the same may be carried into effect, reference will now be made, by way of example, to the accompanying drawings, in which:

FIGURE 1 is a plan view of a mowing machine in accordance with the invention coupled to the rear of an agricultural tractor, FIGURE 2 is a rear elevation as seen in the direction indicated by the arrow II of FIGURE 1, and FIGURE 3 is a side elevation as seen in the direction indicated by the arrow III of FIGURE 1 but shows the machine occupying a slightly tilted position relative to that shown in FIGURES 1 and 2.

Referring to the drawings, the mowing machine has a cuboid gear casing 1 from the front side of which, relative to the intended direction of travel of the machine that is indicated by the arrow V in FIGURE 1, a horizontal pivot pin 2 projects. Two arms 3 and 4 are pivotally mounted on the pin 2. An aligned pivot pin 5 projects from the rear side of the gear casing 1 and two further arms 6 and 7 are pivotally mounted on the latter pin. The machine includes a second gear casing 8 which is not cuboid and the shape of which can be seen best in FIGURE 2 of the drawings. Horizontally aligned pivot pins 9 and 12 project respectively forwardly and rearwardly from the second gear casing 8 and pairs of arms 10, 11 and 13, 14 are turnably mounted on these pins 9 and 12.

The four arms 4, 6, 11 and 14 project obliquely upwardly away from the pins upon which they are pivotally mounted, the ends of these arms remote from the gear casings 1 and 8 being pivotally interconnected by a substantially horizontal shaft 15 that extends parallel to the pins 2, 5, 9 and 12. The other four arms 3, 7, 10 and 13 extend obliquely downwardly away from the pins about which they are pivotable and their free ends are pivotally interconnected by a second shaft 16 that extends parallel to the shaft 15 lying above it. Two pairs of vertically aligned holes are formed through the two shafts 15 and 16 at distances from their opposite ends and two vertical rods 17 (FIGURE 2) are entered through one upper hole and one lower hole respectively. Small transverse pins or the like (not shown) are, of course, entered through the uppermost and lowermost ends of the rods 17 to prevent their falling out of the holes in the shafts 15 and 16. Each rod 17 is surrounded between the shafts 15 and 16 by a corresponding helical compression spring 18.

Two beams 19 and 20 project from the side of the gear casing 1 that is remote from the second gear casing 8, a substantially horizontal plate 21 (FIGURE 1) extends between the two beams 19 and 20. The uppermost edge of a vertical plate 22 is secured to the edge of the plate 21 that is furthest from the gear casing 1. The lowermost edge of the vertical plate 22 has a substantially horizontal plate 23 (FIGURE 2) secured to it so as to extend parallel to the plate 21.

A beam 24 extends obliquely rearwardly from the side of the second gear casing 8 that is remote from the gear casing 1. The end of the beam 24 that is furthest from the second gear casing 8 is bent over downwardly, the bottom thereof carrying a forked bracket 25 which supports a horizontal axle 26 about which a ground wheel 27 is freely rotatable. A plate 28 that is substantially co-planar with the aforementioned plate 21 has one edge secured to the second gear casing 8. Its opposite curved edge is secured to the uppermost edge of a curved plate 29 the central axis of curvature of which extends approximately vertically. The lowermost edge of the curved plate 29 is fastened to a substantially horizontal plate 30 which is parallel to the plate 28 and which extends away from the plate 29 in substantially the same direction as the plate 28. Edges of the two plates 23 and 30 lie adjacent one another and are pivotally interconnected by a shaft 31 that extends parallel to, and which is contained in the same vertical plane as, the two shafts 15 and 16.

A beam 32 projects rearwardly from the beam 20 towards the end of the latter that is remote from the gear casing 1, the rearmost end of the beam 32 being bent over downwardly in a similar manner to the beam 24 and carrying, at its lowermost end, a forked bracket 33 that supports a horizontal axle 34 about which a second ground wheel 35 is freely rotatable. The two axles 26 and 34 are in alignment with one another.

The uppermost end of a substantially vertical rotary shaft 36 is journalled in the gear casing 1, the lowermost end of said shaft being received in a substantially vertical bearing 37 fastened to the plate 23. A square plate 38 is fastened to the shaft 36 a short distance above the plate 23, the plate 38 being stiffened by having its uppermost side secured to the base edge of a shallow conical plate 39 the apex of which is fastened to the shaft 36. Four knives 40 project radially of the shaft 36 from the four corners of the plate 38. Four pairs of upper and lower radial arms 41 project from the shaft 36 a short distance above the apex of the conical plate 39, the four pairs of arms 41 being spaced at 90° intervals around the axis of the shaft 36. Four pairs of further similarly constructed and arranged arms 42 are secured to the shaft 36 towards the uppermost end thereof and at a short distance beneath the gear casing 1. The pairs of arms 41 and 42 occupy identical angular settings about the longitudinal axis of the shaft 36.

The free ends of the various arms 41 and 42 are formed with holes through which four vertical locking pins 45 can be entered. As can be seen in the drawings, an end link of a lower chain 43 is sandwiched between each pair of arms 41 and an end link of an upper chain 44 is sandwiched between each pair of arms 42. The locking pins 45 are entered through the end links just mentioned and thus prevent detachment of the chains 43 and 44 from the arms 41 and 42 until they are removed. Each pair of chains 43 and 44 has the two ends thereof remote from the arms 41 and 42 interconnected by a vertically extending bar 46 of channel-shaped cross-section, the chains 43 and 44 being fastened to the webs of the bars 46. The flanges of the bars 46 thus project away from the webs thereof in directions that are radial of the shaft 36.

The uppermost end of a substantially vertical shaft 47 that is parallel to the shaft 36 is rotatably journalled in the second gear casing 8, the lowermost end of this shaft being received in a substantially vertical bearing 48 fastened to the plate 30. Parts 38 to 46 that are identical to those which have just been described are associated with the shaft 47 in the same manner as with the shaft 36.

The end of the shaft 36 located within the gear casing 1 carries a bevel pinion 49 (FIGURE 1). The teeth of the pinion 49 mesh with those of a bevel pinion 50 that is fastened to a substantially horizontal shaft 51 which projects from the gear casing 1 towards the second gear casing 8. In a similar manner, the uppermost end of the shaft 47 carries a bevel pinion 52 the teeth of which are in meshing engagement with a bevel pinion 53 mounted on a shaft 54 that projects from the second gear casing 8 towards the gear casing 1. A telescopic transmission shaft 55 places the shaft 51 in driving engagement with the shaft 54 by way of universal joints 56 and 57 located at its opposite ends. The teeth of the bevel pinion 49 that is located within the gear casing 1 are also in mesh with those of a bevel pinion 58 fastened to the end of an input shaft 59 which projects rearwardly of the casing 1 within a protective casing. A pulley 60 is secured to the end of the input shaft 59 remote from the gear casing 1.

Two substantially horizontal fan-shaped plates 61 and 62 are turnable about the uppermost and lowermost ends respectively of the shaft 36. The plates 61 and 62 may be considered as approximately triangular in shape with one corner of each triangle substantially coincident with the longitudinal axis of the shaft 36. The edges of the two plates 61 and 62 that diverge away from the shaft 36 are inclined at angles of about 60° to one another. The upper plate 61 is located at the level of the lowermost surface of the gear casing 1 whereas the lower plate 62 bears against the upper side of the plate 23. The similarly curved edges of the two plates 61 and 62 are interconnected by a curved plate 63 the center of curvature of which substantially coincides with the longitudinal axis of the shaft 36. The plate 63 has a rearmost end region 64 (FIGURE 1) which is bent over so as to project rearwardly from the mowing machine. The plate 61 is formed, towards its curved edge, with a curved row of holes 65 any one of which can be brought into register with a single hole in a lug 67 carried by the beam 32 by turning the assembly of plates 61, 62 and 63 about the shaft 36 to an appropriate position. The assembly which has just been mentioned affords a guide member for cut crop that is arranged to be retained in the chosen angular setting about the axis of the shaft 36 by a vertical locking pin 66 entered through the hole in the lug 67 and the chosen hole 65.

A guide member for cut crop is also mounted turnably on the substantially vertical shaft 47, this guide member taking the form of an upper plate 68, a lower plate 69 and an interconnecting curved plate 70. These plates are symmetrically similar to the plates 61 and 63 which have been described above. The plate 68 is formed with a curved row of holes 71 any one of which can be brought into register with a single hole formed in the overlying plate 28. A vertical locking pin 72 is provided for entry through the hole in the plate 28 and the chosen hole 71 to retain the guide member in a corresponding angular setting about the longitudinal axis of the shaft 47.

The ends of the two beams 19 and 20 that are remote from the gear casing 1 are connected to the ends of downwardly inclined beams 73 and 74 respectively, an inclined plate 75 which adjoins the plate 21 being arranged between the beams 73 and 74. A substantially horizontal shaft 76 is journalled in bearings in the ends of the two beams 73 and 74 that are furthest from the gear casing 1. The bent over ends of two inclined beams 77 and 78 that can be seen best in FIGURE 1 of the drawings are turnably mounted on the shaft 76 towards the leading and rearmost ends thereof respectively. The ends of the two beams 77 and 78 that are remote from the shaft 76 are interconnected by a substantially horizontal beam (not visible in the drawings) that extends substantially perpendicular to the direction V. Horizontally aligned pins 79 project from opposite ends of the beam which has just been mentioned. Relatively convergent strips 80 and 81 project upwardly from the ends of the beam to which the pins 79 are secured, their uppermost ends being bent over so as to extend vertically parallel to one another. A strut 82 extends between a region of the beam 78 adjacent the shaft 76 and the junctions between the vertically parallel upper ends of the strips 80 and 81 and the convergent parts of said strips. A strengthening beam 83 extends between the bent-over ends of the beams 77 and 78 to which the shaft 76 is connected and a lug 84 projects from one side of the beam 77 to rotatably support the forwardly projecting end of the shaft 76.

A shaft 86 that extends parallel to the shaft 76 is journalled in a bearing 85 mounted on the upper side of the beam 78 and in a further bearing (not visible) carried by the aforementioned beam upon which the horizontally aligned pins 79 are mounted. A large pulley 87 is mounted on the shaft 86 and two somewhat smaller pulleys 88 and 90 are mounted on the shaft 76 at the leading and rearmost ends thereof respectively. A V-belt, rope or the like 89 places the pulley 87 in driving connection with the pulley 88 and a similar V-belt, rope or the like 91 places the pulley 90 in driving connection with the aforementioned pulley 60 mounted on the input shaft 59 of the gear casing 1. As can be seen best in FIGURE 2 of the drawings, the V-belt, rope or the like 91 is guided around upper and lower small jockey pulleys 92 that are rotatably mounted on a support 93 that projects upwardly from the frame beam 20.

In the use of the mowing machine which has been described, it is mounted on a three-point lifting device at the rear of an agricultural tractor 94 or other vehicle by connecting the two pins 79 to the free ends of the lower lifting links of said device and the vertical parallel portions at the uppermost ends of the strips 80 and 81 to the free end of the adjustable upper lifting link of the same device. The three-point lifting device is preferably adjusted in such a way that the mowing machine occupies the slightly tilted position which can be seen in FIGURE 3 of the drawings. In this position, the majority of the parts which have previously been described as being vertical or substantially vertical are, in fact, inclined at a few degrees to the vertical. The power take-off shaft of the tractor 94 is placed in driving connection with the leading end of the shaft 86 by an intermediate transmission shaft (not shown) having universal joints at its opposite ends. The mowing machine is propelled in the direction V by the tractor 94 and the rotary drive which is transmitted to the input shaft 59 of the gear casing 1 causes the shafts 36 and 47 to be rotated in the directions indicated by the arrows A and B respectively in FIGURE 1 of the drawings. Each of these shafts carries a mowing member afforded by the corresponding plate 38 and knives 40 and it will be obvious that said mowing members rotate in directions such that, at any instant, their relatively closest portions are both moving rearwardly with respect to the direction V. The knives 40 cut the crop and it will be evident from FIGURE 3 that the closeness of cut can be varied to some extent by adjusting the lifting device of the tractor 94 to tilt the whole machine to a chosen setting about the axis afforded by the aligned axles 26 and 34. If the crop is of substantial length, it will be positively thrown rearwardly by the catch members that are afforded by the bars 46. These catch members cause some bruising and crushing of the crop which is generally advantageous since it is conducive to rapid drying of the cut crop. The two plates 63 and 70 that form parts of the guide members for the cut crop cause the crop to be deposited on the ground in the form of a single swath whose width is approximately equal to the perpendicular distance between the two end regions 64 of said plates 63 and 70. This width, which can be adjusted in the manner previously described, is generally less than the working width of the mowing machine but the two guide members can, when desired, be brought to settings such that the width of the swath which is formed is approximately equal to the working width of the mowing machine.

The pivotal and resilient (by virtue of the springs 18) connection between the parts of the frame supporting the two mowing members is such that each one of them can move vertically to some extent independently of the other. In addition, the whole frame that supports the two moving members is turnable about a substantially horizontal axis afforded by the shaft 76 relative to the part of the frame that is fastened to the three-point lifting device of the tractor 94. This ensures that the mowing machine can follow undulations in the surface of the ground over which it is moving without difficulty. There is no danger of the mowing members fouling one another since it will be apparent from FIGURE 1 of the drawings that the parts of one mowing member are turned through 45° about the axis of their supporting shaft 36 or 47 relative to the corresponding parts of the other mowing member.

In order to bring the mowing machine to a position suitable for non-operative transport thereof, the parts of the frame which support the two mowing members can be turned upwardly as a whole about the shaft 76. Retaining means which have been omitted from the drawings for the sake of simplicity are provided to keep the mowing machine in its transport position. The fact that the shafts 36 and 47 are both journalled in bearings above and below the corresponding mowing member ensures that the shafts will not be damaged or readily displaced from their mountings in the event of the machine meeting a minor concealed obstacle such, for example, as a stick or stone. The two ground wheels 27 and 35 of the machine are both located at its rear relative to the direction V so that they do not pass over crop which is about to be mown. It will be apparent that the curved plates 63 and 70 of the two guide members for cut crop normally act to prevent any cut crop from fouling the ground wheels 27 and 35.

What I claim is:

1. A mowing machine having a frame and coupling members associated with said frame for connecting said machine to the rear of a wheeled prime mover, said machine having mowing means positioned entirely laterally of said prime mover during operation, said mowing means including at least two rotary mowing members positioned side-by-side and said mowing members being rotatable about non-horizontal axes, a ground wheel connected to said frame adjacent one end of said row of mowing members, said ground wheel being positioned between said mowing members and said coupling members, behind the foremost circular paths described by said mowing members, said mowing means being tiltable about the axis afforded by said wheel, said ground wheel following substantially in the track of the wheel of the prime mover.

2. A mowing machine as claimed in claim 1, wherein a first part of said frame supports said mowing members and said first part is pivotable about a substantially horizontal axis relative to a second part of the frame, said second part of said frame being associated with said coupling members, and said ground wheel being located between said one end of the row of mowing members and said substantially horizontal axis.

3. A mowing machine as claimed in claim 1, wherein a second frame-supporting ground wheel is located adjacent the other end of said row of mowing members.

4. A mowing machine as claimed in claim 1, wherein two mowing members are included in said row which are arranged to be rotated in relatively opposite directions during operation whereby cut crop passes between said mowing members and is displaced rearwardly of said machine.

5. A mowing machine as claimed in claim 1, wherein catch members for cut crop are rotatably mounted above said mowing members.

6. A mowing machine having a frame with coupling means for connection to a prime mover, at least two mowing members rotatably mounted on shafts supported on said frame, said machine including at least two raking members mounted on said frame to be rotatable about a non-horizontal axis, said mowing members and said raking members being positioned entirely laterally of said coupling means, a ground wheel connected to said frame adjacent one end of said row of mowing members, said ground wheel being positioned between said mowing members and said coupling members, behind the foremost circular paths described by said mowing members, said raking members being located adjacent said mowing members whereby crop is initially cut by said mowing members and thereafter crushed by said raking members.

7. A mowing machine as claimed in claim 6, wherein said rotatable raking members are connected to the rotary shafts of said mowing members whereby during operation, said raking members rotate with, and at the same speed as, said mowing members.

8. A mowing machine as claimed in claim 7, wherein said rotary members are flexibly connected to said mowing members.

9. A mowing machine is claimed in claim 6, wherein said rotary raking members include bars, the longitudinal axes of said bars extending approximately parallel to the axes of rotation of said moving members.

10. A mowing machine as claimed in claim 9, wherein said bars are channel-shaped.

11. A mowing machine as claimed in claim 9, wherein said raking members are connected to the shafts of each mowing member and said bars are located between the cutting knives of each of said mowing members.

12. A mowing machine as claimed in claim 6, wherein said rotatable raking members are detachably mounted on said machine.

References Cited

UNITED STATES PATENTS

| | | | |
|---|---|---|---|
| 2,753,674 | 7/1956 | Cunningham et al. | 56—6 |
| 2,777,272 | 1/1957 | Smith et al. | 56—25.4 |
| 3,197,948 | 8/1965 | Danford | 56—25.4 |
| 3,053,033 | 9/1962 | Maguire | 56—25.4 |
| 3,063,225 | 11/1962 | Barrentine | 56—25.4 |
| 3,070,938 | 1/1963 | Winget | 56—6 |
| 3,097,466 | 7/1963 | King | 56—25.4 |
| 3,157,015 | 11/1964 | Russell et al. | 56—25.4 |
| 3,105,341 | 10/1963 | Crump | 56—192 |

ANTONIO F. GUIDA, Primary Examiner

P. A. RAZZANO, Assistant Examiner

U.S. Cl. X.R.

56—25.4